United States Patent Office 3,577,554
Patented May 4, 1971

3,577,554
SELF-CURING LATEX FOAM COMPOSITIONS
Donald B. Parrish, Lake Jackson, and James M. McDuff, Angleton, Tex., asssignors to The Dow Chemical Company, Midland, Mich.
No Drawing. Filed May 24, 1967, Ser. No. 640,791
Int. Cl. C08f 47/10; C08j 1/16
U.S. Cl. 260—2.5
13 Claims

ABSTRACT OF THE DISCLOSURE

A film-forming latex of a copolymer of an $\alpha,\beta$-ethylenically unsaturated carboxylic acid, such as an acrylic acid, and a copolymerizable ethylenically unsaturated monomer is reacted with an aziridine at a pH below about 5 to form a copolymer having aminoester groups and carboxyl groups and the pH then is adjusted to above 7. The resulting stable latex, optionally containing formulating ingredients, is frothed, dried and cured to obtain a latex foam. Often the frothed composition is applied in the wet state to an adherent substrate, e.g., to a textile, then cured and dried to form an article such as a drapery.

BACKGROUND OF THE INVENTION

(1) Field of the invention

This invention relates to synthetic latex foam. Especially, it relates to improved latex foam compostions and to a method for preparing synthetic latex foam products.

(2) Description of the prior art

It has been known to use synthetic latexes in the preparation of foam rubber or foam sponge since about the time of World War II, first in blends with natural rubber latex and later as the sole latex component. The processes and products are described, for example in E. W. Madge, Latex Foam Rubber, Interscience Publishers, New York, 1962. More recently there has been described in U.S. Pat. No. 3,215,647 new synthetic latex foams which are prepared from latexes (sometimes called reactive latexes) of copolymers having reactive groups and from added water-dispersible compositions which are co-reactive therewith. In the preparation of such latex foam products, the compositions necessarily consist of the latex and the co-reactive material and often also contain other components such as foam stabilizers, pH control agents, foaming aids, thickeners, mineral fillers, antioxidants and may contain other materials such as plasticizers and other formulating agents. The resulting aqueous composition is foamed or frothed by one of various known methods such as by blowing agents, or by whipping, or by use of apparatus having commercially available foam heads. Early effects of the interaction between the latex component and the co-reactive material (sometimes called gelling or gelation because of the paucity of short, exact, descriptive language) assist in holding the frothed composition in its cellular form until further drying and curing, usually by the application of heat, result in the desired foam product.

SUMMARY OF THE INVENTION

It has been discovered, and such discovery is the subject of the present invention, that advantageous latex foam products are prepared by steps including:

(1) Reacting a carboxyl-containing copolymer latex which is film forming at temperatures below about 150° C. with an aziridine at a pH below about 5 to obtain a latex of a polymer having aminoester groups and carboxyl groups, (2) Adjusting the pH of the resulting latex to above 7 to form a basic latex composition, (3) Foaming the basic latex composition to form a wet froth and (4) Drying and curing the wet froth.

The starting carboxyl-containing copolymer latex comprises a copolymer containing from about 1 percent to about 10 percent, preferably from about 3 percent to about 5 percent, by weight of a copolymerized $\alpha,\beta$-ethylenically unsaturated aliphatic carboxylic acid, preferably an acrylic acid. A sufficient quantity of an azirdine (alklyenimine) to react with about ½ of the carboxyl groups is preferred; however, amounts sufficient to react with from about 10 percent to about 70 percent, preferably from about 40 to about 60 percent, of the carboxyl group may be used.

DETAILED DESCRIPTION OF THE INVENTION

In the practice of the present invention, a starting copolymer latex is used which is film forming at a temperature below about 150° C. and which contains from about 1 percent to about 5 percent of a copolymerized $\alpha,\beta$-ethylenically unsaturated aliphatic carboxylic acid, preferably an acrylic acid, based on the total copolymer weight. The starting copolymer latex generally is prepared by polymerization of the carboxylic acid with a copolymerizable ethylenically unsaturated monomer which is capable of polymerization to a water-insoluble polymer.

The preferred $\alpha,\beta$-ethylenically unsaturated aliphatic carboxylic acids are represented by acrylic acid, substituted acrylic acids having an alpha-alkyl substituent with from 1 to 2 carbon atoms, i.e., methacrylic acid and ethacrylic acid. Methacrylic acid is especially preferred. Other alpha-substituted acrylic acids, e.g., alpha-aryl substituted acids such as alpha-phenyl acrylic acid and alpha-tolyl acrylic acid, may be used, however.

The non-acidic monomeric component of the starting film-forming latex copolymer is a copolymerizable, ethylenically unsaturated monomer which is capable of polymerization to a water-insoluble polymer.

Among the non-acidic ethylenically unsaturated monomers are the alkenyl aromatic compounds (the styrene compounds) such as styrene, alpha-methylstyrene, ar-methylstyrene, ar-ethylstyrene, ar - t - butylstyrene, methoxystyrene, cyanostyrene, acetylstyrene, monochlorostyrene, dichlorostyrene and other halostyrenes and vinylnaphthalenes; the conjugated dienes such as 1,3-butadiene, isoprene, phenylbutadiene, 3,4-dimethyl-1,3-hexadiene, piperylene and 4,5-diethyl-1,3-octadiene; the halo-substituted, monoethylenically unsaturated monomers such as vinyl chloride, vinyl bromide, vinylidene chloride and vinylidene bromide; acrylonitriles such as acrylonitrile and methacrylonitrile; alkyl esters of an acrylic acid such as methyl acrylate, methyl methacrylate, ethyl acrylate, n-butyl acrylate, n-butyl methacrylate, n-hexyl acrylate, cyclohexyl acrylate, 2-ethylhexyl acrylate, 2-ethylhexyl methacrylate; hydroxyalkyl esters of an acrylic acid such as 2-hydroxyethyl acrylate, 2-hydroxyethyl methacrylate, 2-hydroxypropyl acrylate, 2-hydroxypropyl methacrylate, and low molecular weight esters of an acrylic acid and polyglycols having from 2 to 6 ethoxy or propoxy units; alkyl esters of monoethylenically unsaturated dicarboxylic acids such as diethyl maleate, dimethyl fumarate, dibutyl maleate, dimethyl itaconate; and other oxygen-containing ethylenically unsaturated monomers which are stable in aqueous media at a pH of about 6.5 such as methylisopropenyl ketone, vinyl acetate, vinyl propionate, and the like.

The acidic and non-acidic monomers are copolymerized at an acid pH in aqueous emulsion containing surface active agents, free-radical producing catalysts and under conditions of time, temperature, pressure, etc. in accordance with the procedures known for emulsion polymerization. Often at least one anionic emulsifier is included in the polymerization charge. Non-ionic emulsifiers, when used, are limited to amounts sufficiently small as not to interfere importantly with subsequent wet froth stability during the latter stages of preparation of foam sponge. For at least a part of the emulsifier system, sodium lauryl sulfate is a preferred anionic type. However, other anionic emulsifiers may be used, of which representative types are the alkali metal alkyl aryl sulfonates, the alkali metal alkyl sulfates, the sulfonated alkyl esters, and the like. Specific examples of these well-known emulsifiers (for the purpose of illustration and not for limitation) are dodecylbenzene sodium sulfonate, sodium di-secondary butyl naphthalene sulfonate, disodium dodecyl diphenyl ether disulfonate, N-octadecyl disodium sulfosuccinamate.

Optionally, other ingredients well-known in the emulsion polymerization art may be included such as chelating agents, thickeners, redox agents, buffering agents, inorganic salts and pH adjusting agents.

The polymerization is carried out batchwise, continuously or stepwise as by production of a seed latex, followed by batchwise and/or continuous addition of the remaining constituents.

While the latexes preferably are prepared by emulsion polymerization, solution polymerization or other polymerization methods may be used with subsequent conversion of the products by known procedures to latex form. Alternative to the direct polymerization of all of the constituent monomers a polymer of one or more non-acidic monomers may be treated with the acidic monomer by known graft polymerization methods to obtain a graft copolymer having the requisite carboxyl groups.

Except where indicated otherwise by the context, the term "carboxyl group" is intended to include the carboxylic acid group (—COOH) per se and the ionizable salts such as the alkali metal and ammonium salts.

In general, such groups are readily interconvertible between the ionized (salt) form and the acid form by the addition of mineral acids or of alkali metal hydroxides or ammonium hydroxide. Of course, due consideration must be given to the dispersion stability of the overall composition during such interconversion. Nevertheless, the carboxyl-containing monomers, such as methacrylic acid, are more readily polymerized in the acid (COOH) form than in the ionized (salt) form.

Because of a highly desirable combination of properties in the resulting latex foam product, such as good resistance to deterioration from heat and light, from washing and from dry cleaning as well as suitable resilience and other properties providing good hand in a foam fabric-backing, an especially preferred composition for the carboxyl-containing latex component used in the practice of this invention is an aqueous colloidal dispersion of a copolymer of from about 5 percent to about 10 percent by weight of an acrylonitrile, from about 3.5 percent to about 10 percent by weight of an hydroxyalkyl acrylate, such as described above, from about 0.4 percent to about 5 percent by weight of a polyethylenically unsaturated crosslinking monomer such as divinyl benzene and ethylene dimethacrylate, from about 3 percent to about 5 percent by weight of methacrylic acid, and from about 70 percent to about 88.1 percent by weight of a lower alkyl ester of an acrylic acid such as ethyl acrylate or butyl acrylate or a mixture thereof.

Rather than using a combination of an α,β-ethylenically unsaturated carboxylic acid and a hydroxyalkyl ester of such an acid in these preferred compositions, a monomer containing both a mono(hydroxyalkyl) ester group and a carboxylic acid group, i.e., a mono(hydroxyalkyl) ester of an α,β-ethylenically unsaturated polycarboxylic acid, may be copolymerized with the other required monomeric components to form the latex product of this invention. Representative of such dual function monomers are 2-hydroxyethyl acid maleate, 2-hydroxyethyl acid fumarate, 2-hydroxypropyl acid maleate, 4-hydroxybutyl acid maleate and 2-hydroxyethyl acid itaconate. Mixtures of the above-described dual function monomers with other ethylenically unsaturated carboxylic acids and/or other hydroxyalkyl esters also may be used.

The ethylenically unsaturated crosslinking monomer which is copolymerized in the preferred latex compositions for use in the practice of this invention is a polyethylenically unsaturated monomer capable of polymerizing under free-radical conditions to covalently bond different chains of a polymer. Such crosslinking monomers are represented by divinyl benzene, ethylene glycol diacrylate (sometimes called ethylene diacrylate), diethylene glycol diacrylate, triethylene glycol diacrylate, higher polyglycol diacrylates, ethylene glycol dimethacrylate, diethylene glycol dimethacrylate, triethylene glycol dimethacrylate, higher polyglycol dimethacrylates, allyl acrylate, allyl methacrylate, diethylene glycol divinyl ether, and the like.

The aziridines which are reacted with the carboxyl-contained latexes as one step in the practice of this invention are the alkylenimines having the following formula:

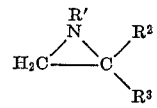

wherein R′, R² and R³ individually are hydrogen, an alkyl having from 1 to 12 carbon atoms, an aryl, an alkaryl, an aralkyl, substituted alkyls such as cyanoalkyl, haloalkyl, aminoalkyl, hydroxyalkyl, aloxyalkyl and similarly substituted aryls, alkaryls and aralkyls. The preferred aziridines are aziridine (ethylenimine), and 2-methyl aziridine. Representative other aziridines are 2-dodecyl aziridine,
2,2-dimethyl aziridine
2-phenyl aziridine,
(2,3-diphenyl)aziridine,
2-(phenylmethyl)aziridine,
2-(2-hydroxyethyl)aziridine,
2-(2-aminoethyl)aziridine,
2-(4-methylphenyl)aziridine,
2-cyanoethyl aziridine,
1-ethyl aziridine,
1-butyl aziridine,
1-(2-phenylethyl)aziridine,
1-(2-cyanoethyl)aziridine,
1-(2-hydroxyethyl)aziridine,
1-phenyl aziridine,
1-phenylmethyl aziridine,
1-(2-aminoethyl)aziridine,
1-(4-chlorophenyl)aziridine,
and 2-(4-chlorophenyl)aziridine.

In the process of the present invention a latex foam is prepared by steps including reacting an aziridine, as described, with a carboxyl-containing copolymer latex at a pH below about 5 to form a stable aqueous dispersion of polymer which is capable of self-crosslinking. The aziridine is used in an amount which preferably is sufficient to react with about one-half, such as from about 40 to about 60 percent, of the carboxyl groups present in the latex copolymer but amounts theoretically sufficient to react with from about 10 percent to about 70 percent of the carboxyl groups may be used. Ordinarily the copolymer latex has a solids content of at least 40 percent by weight, but preferably has from about 60 percent to about 65 percent by weight. The pH of the aqueous dispersion of self-crosslinkable polymer thus obtained is adjusted to a value greater than about 7 with usual alkalizing ingredients; e.g., alkali metal hydroxides such as sodium hydroxide and potassium hydroxide, or amines such as morpholine, ethanol amine, methyl amine and ethylamine, but preferably with ammonium hydroxide or gaseous ammonia.

For convenience and brevity, a carboxyl-containing copolymer latex which has been reacted with an aziridine in the above described manner is sometimes referred to as an "iminated latex." The aqueous dispersions thus obtained usually, but not necessarily, are further compounded with one or more added components such as foaming aids, foam stabilizers, bactericides, dyes, thickeners, plasticizers, antioxidants and inorganic fillers such as clay, whiting, talc, mica, lithopone, titanium dioxide and the like. Polymeric fillers such as powdered polyvinyl chloride may also be used. Polyvalent metal oxides, especially zinc oxide, which are somewhat reactive with the residual carboxyl groups, also often are used in limited amounts. Such additional formulating ingredients, especially the fillers, often are added as an aqueous dispersion having a solids content of from about 50 to about 70 percent by weight. While not required and often not used, a gelling agent of the type known in the preparation of the early latex foams may be added in the formulation of the foamable aqueous compositions.

Preferably the foamable aqueous dispersion, either fully or partially formulated (often called the foam formulation), is converted to a wet froth by beating or whipping air into the aqueous dispersion, or by use of apparatus having foam heads, for example, those of the type now commercially available, some of which are suitably adapted for addition of a pre-selected kind and amount of formulating ingredient during the foaming or frothing step. Optionally, however, other methods may be used for the foaming or frothing step. For example, the injection of inert gases such as nitrogen, the liberation by chemical reaction of gases such as hydrogen, oxygen or carbon dioxide, the vaporization of volatile liquids— all under appropriate conditions such as changes in temperature, pressure and pH of the system.

The wet froth suitably is placed in molds, spread on a flat tray, coated (for example, by suitable doctoring equipment) onto either a substrate to which it will adhere or releasably onto a material or layer having a nonadherent surface such as of polytetrafluoroethylene or onto a surface, for example, a belt, which has been treated with a release agent. The early effects, usually at elevated temperatures, of the interaction of the wet froth ingredients including the iminated, carboxylic polymer latex and the optionally added thickener, foam stabilizers, zinc oxide and the like, assist in holding the wet froth in its cellular form until drying and curing result in the desired foam sponge product. The drying and curing steps may occur separately in the order shown or concurrently. Drying may occur at about room temperature or can be carried out at elevated temperature. However, the curing and drying steps are accelerated by heat and in many cases temperatures considerably above room temperature, such as from about 100° C. to about 170° C., are used in order to obtain a due amount of crosslinking in a predetermined time schedule. In general, the required time is inversely related to the temperature. When elevated temperatures are employed for the curing step, both the temperature and the time of heating should be limited so that adverse side effects upon the modified copolymer and/or on any substrate are minimized, i.e., below the decomposition temperature of both.

The adherent substrates to which the wet latex froth is applied and to which the cured dried foam adheres are not narrowly critical as to composition. Various materials such as loosely woven netting materials, glass fiber sheets (including use as draperies), woven and non-woven fabrics of natural materials such as protein fibers, cotton, wool, and crosslinked cellulose and synthetic fibers such as of polyesters, polyamides, polymers and copolymers of acrylonitrile, copolymers of vinylidene chloride and vinyl chloride, polyolefins and the like. Various common packaging materials such as the numerous forms of paper products known as boxboard, cardboard, paperboard, paper sheets, and the like may also function as substrates for the latex foam. Especially desirable drapery articles are obtained by the process of the present invention.

Thus by the process of this invention, advantageous latex foam products are obtained from latexes of carboxyl-containing copolymers without requiring the addition of polyfunctional reactive agents or sulfur-type vulcanizing agents. Limited amounts of such agents may be used, however.

The following examples illustrate how the invention may be practiced but are not to be construed as limiting its scope. In the examples, all parts and percentages are by weight unless otherwise specified.

EXAMPLE 1

To 173 parts of a latex at a temperature of 70° C., having a pH of 3.3 and containing 100 parts by weight of a copolymer of 86.6 parts of ethyl acrylate, 5 parts of acrylonitrile, 5 parts of 2-hydroxyethyl acrylate, 0.4 part of ethylene dimethacrylate and 3 parts of methacrylic acid, was added slowly 0.75 part of ethylenimine in 3 parts of water. After one-half hour at the above-noted temperature, sufficient ammonium hydroxide was added to raise the pH to 7.8 and the resulting product was allowed to cool. That product was introduced into a kitchen-type mixer then in sequence were added 4.2 parts of sodium lauryl sulfate and 6.75 parts of zinc oxide as a ground mixture, 100 parts of dry hydrated alumina and 0.5 part of methyl cellulose, 4000 cps. grade, as a 2.5-percent aqueous solution. The ingredients were whipped by the mixer until a froth density of 16 pounds per cubic foot was obtained. The resulting wet froth was doctored onto a muslin substrate at a thickness of ¼ inch which was then placed in an oven at 160° C. for 15 minutes. The product was a uniform cell-sized, white latex foam having excellent adhesion to the muslin substrate and having good "hand."

A sample of the product was subjected to a wash test which consisted of placing the sample, for one hour, in a two-percent aqueous solution of a commercial detergent ("Tide") which was agitated at a temperature of 70° C. The sample was undamaged in the test which is equal to about 5 ordinary laundry cycles.

Another sample of the product was tested in a commercial coin-operated dry cleaning machine (Norge) using perchloroethylene solvent. The properties of the sample were essentially unaffected by the dry cleaning test.

EXAMPLE 2

A latex of a copolymer of 90 parts of ethyl acrylate, 5 parts of acrylonitrile, 1 part of ethylene dimethacrylate and 4 parts of methacrylic acid at a pH of 2.5 was placed in a reactor and heated to 70° C. One part of ethylenimine (in 4 parts of water) for each 100 parts of copolymer in the latex was added to the reactor over a 5-minute period. After an additional half hour sufficient ammonium hydroxide was added to raise the pH to a value of about 9, then the reaction mixture was allowed to cool and subsequently was filtered. Latex foam prepared therefrom substantially as described in Example 1 had excellent resistance to dry cleaning solvents, excellent washability, excellent resilience, good light resistance, and good hand.

EXAMPLE 3

A latex of a copolymer of 42.5 parts of n-butyl acrylate, 42.5 parts of ethyl acrylate, 5 parts of acrylonitrile, 5 parts of 2-hydroxyethyl acrylate, 4 parts of methacrylic acid and 1 part of a vinyl aromatic mixture consisting of approximately 55 percent of divinyl benzene and 45 percent of ethylvinylbenzene at a pH of 2.5 was reacted with 1 part of ethylenimine for each 100 parts of polymer in the latex according to the procedure described in Example 2. A latex foam prepared therefrom is white, uniform in cell size, shows very good resistance to dry cleaning solvents in harmony with the film data in Table I, below, and has very good resilience, i.e., slightly better than for the latex foam prepared in Example 2.

EXAMPLE 4

A latex of a copolymer of 43 parts of butyl acrylate, 43 parts of ethyl acrylate, 5 parts of acrylonitrile, 5 parts of 2-hydroxyethyl acrylate and 4 parts of methacrylic acid at a pH of 2.5 was treated with 1.2 parts of ethylenimine per 100 parts of polymer in the latex. A latex foam prepared therefrom substantially according to the description of Example 1 is white, and is uniform in cell size, has very good resistance to dry cleaning solvents in conformity with the data in Table I below, and has very good resilience, i.e., approximately equal to that obtained in Example 3.

EXAMPLE 5

A latex of a copolymer of 86.6 parts of butyl acrylate, 5 parts of acrylonitrile, 5 parts of 2-hydroxyethyl acrylate, 0.4 part of ethylene dimethylacrylate and 3 parts of methacrylic acid at a pH of 2.5 was treated with 0.75 part of ethylenimine per 100 parts of latex solids substantially in the manner described in Example 1. A latex foam prepared therefrom has good resistance to dry cleaning solvents in concordance with the film data in Table I below, and has very good resilience, i.e., somewhat better than that obtained in Example 3 and in Example 4.

Area swell measurements were obtained from films of latexes in the following manner. A 20-mil film of each latex was cast, then air dried at ambient temperature for from 4 to 6 days. Samples of a pre-determined size were cut from each film. Four samples from each latex were baked in an oven at 300° F. for 15 minutes. The separate samples subsequently were immersed in one of various solvents for 16 hours to reach equilibrium swelling. The area of the swollen films was determined and values were calculated according to the following:

$$\frac{\text{swollen area}}{\text{original area}} \times 100\% = \text{swell value}$$

The results are shown in Table I.

In Table I, it is noted that the lower values are more advantageous. The correlation of progressively improved dry cleaning resistance of the finished foam with decreasing swell values for the film was found to be good.

Latex foams which have similar properties are prepared as in Examples 1–5 by substituting individually 2-methyl aziridine, 2-decyl aziridine, 2,2-dimethyl aziridine, 2,3-diphenyl aziridine, 2-(2-cyanoethyl)aziridine and 1-ethyl aziridine for the ethylenimine of those examples.

That which is claimed is:

1. A process for preparing latex foam sponge comprising the steps of
   (1) reacting an aqueous composition comprising a starting carboxyl-containing copolymer latex which is film-forming below a temperature of 150° C. with an aziridine at a pH below about 5 to obtain a stable latex of a copolymer having pendant aminoester groups and pendant carboxyl groups;
   (2) adjusting the pH of the resulting latex to a value greater than 7 to form a basic latex composition;
   (3) foaming the basic latex composition to form a wet froth comprising the copolymer;
   (4) drying and curing the wet froth;
said starting copolymer latex containing a copolymer of from about 5 percent to about 10 percent by weight of an acrylonitrile, from about 3.5 percent to about 10 percent of an hydroxyalkyl acrylate, from about 0.4 percent to about 5 percent of a polyethylenically unsaturated crosslinking monomer capable of polymerizing under free-radical conditions to covalently bond different chains of a polymer, from about 3 percent to about 5 percent of an alpha-substituted acrylic acid and from about 70 percent to about 88.1 percent of at least one lower alkyl ester of an acrylic acid; all percentages being by weight.

2. The process of claim 1 in which an inorganic filler is added after the step of adjusting the pH of the latex.

3. The process of claim 1 in which the amount of the aziridine is from about 40 percent to about 60 percent of the amount required theoretically to react with all of the carboxyl groups.

4. The process of claim 1 in which an aqueous dispersion of zinc oxide is added after the step of adjusting the pH of the latex.

5. A process according to claim 1 in which the wet froth is coated onto an adherent substrate before the drying and curing step.

6. The process of claim 1 in which the starting copolymer latex includes a surfactant exclusively of the anionic type.

7. The process of claim 1 in which the starting carboxyl-containing copolymer latex is an aqueous colloidal dispersion of a copolymer of from about 5 percent to about 10 percent by weight of an acrylonitrile, from about 3.5 percent to about 10 percent of an hydroxyalkyl acrylate, from about 0.4 percent to about 5 percent of a polyethylenically unsaturated crosslinking monomer capable of polymerizing under free-radical conditions to covalently bond different chains of a polymer, from about 3 percent to about 5 percent of an alpha-substituted acrylic acid and from about 70 percent to about 88.1 percent of at least one lower alkyl ester of an acrylic acid; all percentages being by weight.

TABLE I

| Latex tested (from Example No.) | Perchloroethylene | | Toluene | | Hexane | | Water | |
|---|---|---|---|---|---|---|---|---|
| | Baked film | Air dried film | Baked film | Air dried film | Baked film | Air dried film | Baked film | Air dried film |
| 1 | 137 | 128 | 292 | 503 | 100 | 105 | 115 | 128 |
| 2 | 137 | 137 | 291 | 303 | 100 | 105 | 100 | 115 |
| 3 | 214 | 229 | 326 | 544 | 115 | 115 | 115 | 115 |
| 4 | 214 | 229 | 362 | 619 | 115 | 115 | 115 | 115 |
| 5 | 275 | | 381 | | 128 | | 100 | |

8. The process of claim 1 in which the alpha-substituted acrylic acid is methacrylic acid.

9. The process of claim 7 in which an aqueous dispersion of zinc oxide is added after the step of adjusting the pH of the latex.

10. The process of claim 7 in which the amount of the aziridine is from about 40 percent to about 60 percent of the amount required theoretically to react with all of the carboxyl groups.

11. The process of claim 3 in which the wet froth is coated onto an adherent textile substrate whereby there is obtained a resilient, launderable, dry-cleanable foam article.

12. The process of claim 1 in which the polyethylenically unsaturated crosslinking monomer is ethylene dimethacrylate.

13. The process of claim 1 in which the polyethylenically unsaturated crosslinking monomer is divinyl benzene.

References Cited

UNITED STATES PATENTS

| | | | |
|---|---|---|---|
| 3,311,582 | 3/1967 | Sparks et al. | 260—29.4 |
| 3,215,647 | 11/1965 | Dunn | 260—2.5L |
| 3,261,796 | 7/1966 | Simms | 260—29.6TA |
| 3,261,797 | 7/1966 | McDowell et al. | 260—29.6TA |
| 3,261,799 | 7/1966 | Vermont | 260—29.6TA |
| 3,282,879 | 11/1966 | Werner | 260—29.6RW |

MURRAY TILLMAN, Primary Examiner

M. FOELAK, Assistant Examiner

U.S. Cl. X.R.

161—89, 92, 159; 260—29.6, 29.7